May 15, 1956  C. KELLER  2,745,969
TURBO-MACHINES
Filed Oct. 22, 1952
Fig. 1
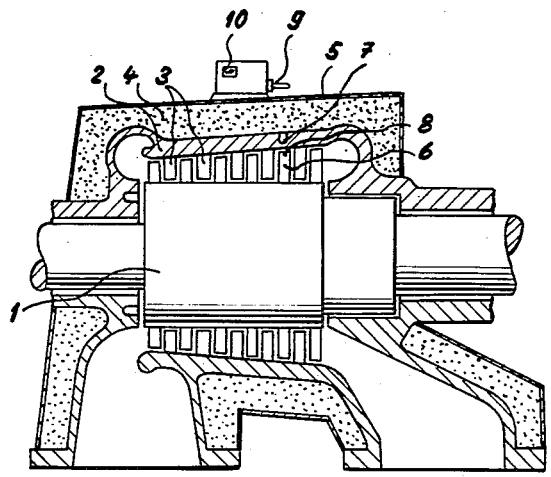
Fig. 2
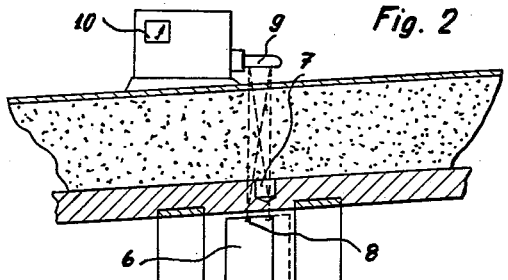
Fig. 5
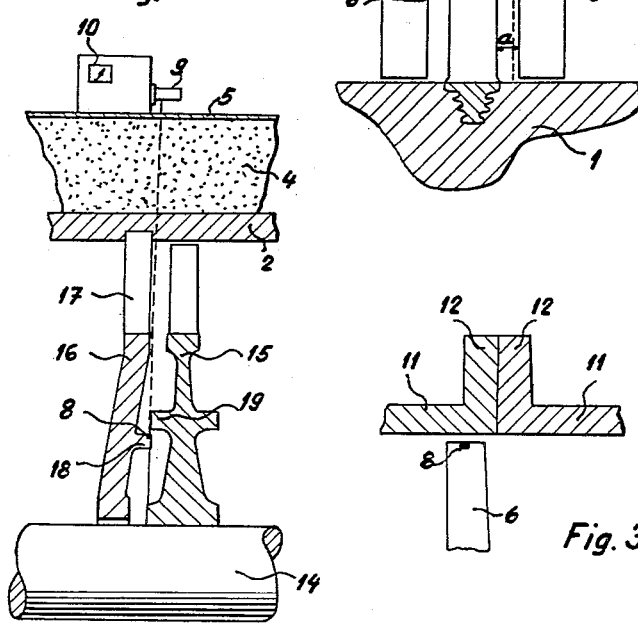
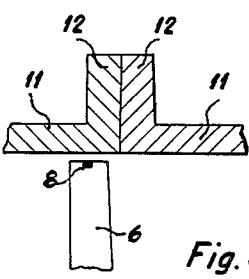
Fig. 3
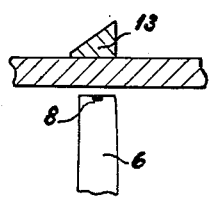
Fig. 4
INVENTOR:
Curt Keller
By Dodge and Sons
Attorneys United States Patent Office
2,745,969
Patented May 15, 1956

2,745,969

TURBO-MACHINES

Curt Keller, Kusnacht, Switzerland, assignor to Aktiengesellschaft Fuer Technische Studien, Zurich, Switzerland, a corporation of Switzerland Application October 22, 1952, Serial No. 316,166

Claims priority, application Switzerland October 25, 1951

6 Claims. (Cl. 250—83.6)

The invention relates to turbo-machines, in which a rotating part can be displaced relatively to a fixed part as a result of thermal expansion.

In turbo-machines which are subjected to high temperatures, for example, steam turbines and gas turbines, the parts thereof can expand to different degrees, especially when such machines are started rapidly from the cold state or are placed under load. Thin-walled parts usually become hot more quickly than thick-walled parts. The supply of heat to the parts also depends on the extent to which each part is acted upon by the flow of hot fluid through the turbo-machine. Thus, for example, the turbine shaft located inside the machine expands to a greater extent than the housing, so that relative displacements can occur between the rotating shaft and the fixed housing. If such displacements assume a relatively large value, they can easily lead to the rotors carried by the shaft rubbing on the guide wheels of the housing, which can be the cause of serious damage.

For reasons of reliability in operation and also for the purpose of obtaining good efficiency, it is therefore important to be able to have an indication of the relative positions of certain elements of the machine. For this purpose, it has already been proposed, for example, to ascertain the relative position between the rotor and the stator of a steam turbine or gas turbine by means of a feeler. This however necessitates the provision of a separate stuffing box, so that the movements of the feeler inside the housing can be transmitted to the outside and, in addition, there is the danger of incorrect readings because the feeler element may, for example, become worn or bent.

It has also been proposed to ascertain the relative position between the rotor and stator by electrical means, using capacitive or inductive elements. However, it has been shown that such arrangements, which are in part subjected to the high temperatures, are extremely difficult to construct and moreover require the provision of several auxiliary devices. Furthermore, the fitting of elements of the type referred to in the vicinity of a turbine rotor is always a source of danger.

The objects of the invention are to avoid disadvantages of the type set forth above. According to the invention, for detecting relative movement between a rotating part and a fixed part of a turbo-machine resulting from thermal expansion, one of the said parts has applied to it a radioactive substance and means are provided on the other part for varying the intensity of the radio-active rays in accordance with the relative positions of the two parts, means such as a Geiger counter being also provided to measure the variations in intensity of the rays.

Embodiments of arrangements according to the invention are shown by way of example in the accompanying drawing, wherein:

Figure 1 is an axial longitudinal section through an axial flow turbine with an arrangement according to the invention, Figure 2 is a part of Figure 1 at an enlarged scale, Figures 3 and 4 show two further details of construction, and Figure 5 is an axial longitudinal section through a part of an axial-flow turbine with guide wheels and rotating discs.

In Figures 1 and 2, the numeral 1 represents a rotor drum of a steam turbine which operates at high temperatures and is surrounded by a casing 2, carrying guide blades 3, a heat-insulating layer 4 and an outer casing 5 of sheet metal; 6 is a rotor blade.

Formed in the casing 2 in the vicinity of the rotor blade 6 is a bore 7 and in addition a radio-active subtance 8 has been applied on the outside periphery of the blade 6. The numeral 9 indicates a Geiger counter arranged outside the housing 2, 4, 5, that is to say, beyond the region of high temperatures, for receiving the rays coming from the radio-active substance 8. The housing 2, 4, 5 exerts a screening effect in relation to these rays. Variation in the intensity of the rays which pass to the counter 9 are capable of being determined by means of the latter and of being read, for instance, on a dial 10.

The bore 7 represents a means which enables the intensity of the rays passing to the counter 9 to be influenced. The more rays which pass through this bore 7, the more intense is the pencil of rays which reaches the counter 9. The number of rays which go out from the substance 6 through the bore 7 depends upon the position which the blade 6 assumes in relation to this bore, so that by means of the latter and the counter 9, it is possible to ascertain the relative position between the rotor and the stator (parts 6 and 3) of the turbine. The arrangement may be such, for example, that with the lowering of the distance $a$ between the rotor blade 6 and the guide blade 3 located on the right thereof to a dangerous minimum, a maximum of rays passes through the bore 7, so that the intensity of the rays passing from the radio-active substance 8 to the counter 9 is so great that it can render operative a light signal, sound signal or similar signal, either directly or, for example, through amplifiers.

In the constructional form shown in Figure 3, the intensity of the rays which originate from the radio-active substance 8 and pass to a Geiger counter (not shown) are varied by the screening action of a housing 11 comprising flanges 12. The more rays which go through the flanges 12, the weaker is the intensity of the rays which pass to the counter.

With the constructional form according to Figure 4, the same applies as soon as more rays go through an additional screening member 13.

Since the sensitive counter 9 is set up outside the machine housing, that is to say, outside the range of high temperatures and, in addition, no auxiliary mechanical or electrical means for transmitting the movement have to pass through the machine housing for the purpose of ascertaining the relative position of the parts of the turbo-machine which are concerned, the arrangement described is reliable in operation and reliable as regards its data. It is possible to operate with a very small quantity of radio-active substance.

The radio-active substance can also be arranged at any point on a stationary part of a turbo-machine in the vicinity of one of its rotating parts. For example, the radio-active substance can be applied at a position on the fixed guide blade disc.

The turbine a part of which is shown in Figure 5 comprises a rotor consisting of a shaft 14 and bladed runner wheels, one of which is shown and carries the reference numeral 15. 16 in a guide blade disc, with guide blades 17, inserted in the casing 2. The radio-active substance 8 has been applied on a projecting part 18 of the guide disc. With a relative movement between this disc and the adjacent rotor wheel 15, that is to say, between the stator and rotor of the turbo-machine, a projection 19 provided on the rotor wheel concerned is introduced to a greater or lesser extent into the pencil of rays which normally pass from the radio-active substance 8 to the Geiger counter 9 outside the turbine housing, so that a greater or lesser amount of these rays is screened by said projection of the rotor wheel before reaching the Geiger counter.

Instead of a projection of the runner wheel itself other means, as for instance a covering strip projecting laterally from the outside periphery, can be provided on a runner wheel adjacent to the guide disc, said means, with a relative movement of stator and rotor, extending to a greater or lesser extent into the pencil of rays which normally passes from that substance to the counter.

The arrangement may also be employed when it is required to ascertain the position of parts which are displaced relatively to one another in radial direction.

What is claimed is:

1. The combination of an axial-flow turbine consisting of a rotor and a housing surrounding said rotor; a radio-active substance applied to a runner blade of said rotor; a counter of radio-active rays arranged outside the housing in the vicinity of said runner blade; said housing presenting a discontinuity in wall thickness in the region of axial displacements of that blade, so that the intensity of the rays passing from the radio-active substance to the counter is modified according to axial displacements of the rotor blade relatively to the housing.

2. The combination defined in claim 1 in which the housing has a cut-away portion in the region of the axial displacements to be determined.

3. The combination defined in claim 1 in which the housing is formed with flanges in the region of the axial displacements to be determined.

4. The combination defined in claim 1 in which the housing comprises a supplementary screening member in the region of the axial displacements to be determined.

5. The combination of an axial-flow turbine comprising a rotor with runner wheels, fixed guide wheel discs and a housing surrounding the rotor and the guide wheel discs; a radio-active substance arranged on a guide wheel disc; a counter of radio-active rays arranged outside the housing in the vicinity of said guide wheel disc; and means provided on an adjacent runner wheel which with a relative movement between the runner wheel and the guide wheel extend to a greater or lesser extent into the pencil of rays passing from the radio-active substance to the counter.

6. The combination defined in claim 5 in which the means provided on the runner wheel comprises a lateral projection.

References Cited in the file of this patent

UNITED STATES PATENTS

| | | |
|---|---|---|
| 2,467,812 | Clapp | Apr. 19, 1949 |
| 2,501,560 | Blau | Mar. 21, 1950 |
| 2,518,115 | Bernstein | Aug. 8, 1950 |
| 2,522,522 | Krasnow | Sept. 19, 1950 |
| 2,566,868 | Allia | Sept. 4, 1951 |